(12) United States Patent
Ho et al.

(10) Patent No.: US 12,248,665 B2
(45) Date of Patent: *Mar. 11, 2025

(54) METHOD AND APPARATUS FOR SUPPORTING USER INTERACTIONS WITH NON-DESIGNATED LOCATIONS ON A DIGITAL MAP

(71) Applicant: GOOGLE LLC, Mountain View, CA (US)

(72) Inventors: Kelvin Ho, San Francisco, CA (US); Jonah Jones, San Francisco, CA (US); Yatin Chawathe, San Francisco, CA (US); Bernhard Seefeld, San Francisco, CA (US); Paul Merrell, Palo Alto, CA (US); Alirez Ali, Sunnyvale, CA (US); Jonathan Siegel, Mountain View, CA (US); Daniel Otero, Seattle, WA (US); Su Chuin Leong, South San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 14 days.

This patent is subject to a terminal disclaimer.

(21) Appl. No.: 18/377,203

(22) Filed: Oct. 5, 2023

(65) Prior Publication Data
US 2024/0086040 A1 Mar. 14, 2024

Related U.S. Application Data

(63) Continuation of application No. 17/942,757, filed on Sep. 12, 2022, now Pat. No. 11,816,315, which is a
(Continued)

(51) Int. Cl.
*G06F 3/00* (2006.01)
*G01C 21/00* (2006.01)
(Continued)

(52) U.S. Cl.
CPC ....... *G06F 3/0484* (2013.01); *G01C 21/3881* (2020.08); *G09B 29/003* (2013.01); *H04W 4/029* (2018.02)

(58) Field of Classification Search
CPC .. G06F 3/0484; H04W 4/029; G01C 21/3881; G09B 29/003
See application file for complete search history.

(56) References Cited

U.S. PATENT DOCUMENTS

| | | |
|---|---|---|
| 5,559,707 A | 9/1996 | DeLorme et al. |
| 5,844,570 A | 12/1998 | Curtright et al. |

(Continued)

FOREIGN PATENT DOCUMENTS

EP 2 299 370 A1 3/2011

OTHER PUBLICATIONS

Bouju, A. Stockus, R. Bertrand and P. Boursier, "Location-based spatial data management in navigation systems," Intelligent Vehicle Symposium, 2002. IEEE, Versailles, France, 2002, pp. 172-177 vol.1, doi: 10.1109/IVS.2002.1187947. (Year: 2002).

(Continued)

*Primary Examiner* — Brett A Feeney
*Assistant Examiner* — Andrew Chung
(74) *Attorney, Agent, or Firm* — MARSHALL, GERSTEIN & BORUN LLP

(57) ABSTRACT

A mapping system allows a user to interact with any location on a digital map and present the user with location related information associated with the selected location. The location related information may be in the form or a card, pop-up, image, or other graphic and may be displayed on the map at or near the selected location, around the map, etc. The displayed location related information may include predetermined or pre-stored data about the location or may include location related information collected and generated (Continued)

on the fly in response to the user interaction with the digital map. The displayed location related information may be displayed in the same graphical format on the digital map regardless of whether location related information is predetermined information about the location that already exists or information that is collected and generated on the fly in response to the user interaction.

20 Claims, 5 Drawing Sheets

Related U.S. Application Data continuation of application No. 13/895,315, filed on May 15, 2013, now Pat. No. 11,481,091.

(51) Int. Cl.
G06F 3/0484 (2022.01)
G09B 29/00 (2006.01)
H04W 4/029 (2018.01)

(56) References Cited

U.S. PATENT DOCUMENTS

| | | | |
|---|---|---|---|
| 5,884,219 | A | 3/1999 | Curtwright et al. |
| 6,314,370 | B1 | 11/2001 | Curtright |
| 6,321,158 | B1 | 11/2001 | DeLorme et al. |
| 6,515,595 | B1 | 2/2003 | Obradovich et al. |
| 6,836,270 | B2 | 12/2004 | Du |
| 7,532,900 | B2 | 5/2009 | Wilson et al. |
| 7,668,651 | B2 | 2/2010 | Searight et al. |
| 7,710,421 | B2 | 5/2010 | Muramatsu |
| 7,894,984 | B2 | 2/2011 | Rasmussen et al. |
| 7,913,192 | B2 | 3/2011 | Dicke et al. |
| 7,945,852 | B1 | 5/2011 | Pilskalns |
| 8,037,166 | B2 | 10/2011 | Seefeld et al. |
| 8,041,503 | B2 | 10/2011 | Choi et al. |
| 8,060,510 | B2 | 11/2011 | Ghanekar et al. |
| 8,108,416 | B2 | 1/2012 | Marlow |
| 8,131,118 | B1 | 3/2012 | Jing et al. |
| 8,150,967 | B2 | 4/2012 | King et al. |
| 8,164,599 | B1 | 4/2012 | Kadous et al. |
| 8,166,016 | B2 | 4/2012 | Higgins et al. |
| 8,180,851 | B1 | 5/2012 | CaveLie |
| 8,204,966 | B1 | 6/2012 | Mendis et al. |
| 8,326,327 | B2 | 12/2012 | Hymel et al. |
| 8,352,185 | B2 | 1/2013 | Van Essen |
| 8,355,738 | B1 | 1/2013 | Lee |
| 8,368,723 | B1 | 2/2013 | Gossweiler, III et al. |
| 8,447,136 | B2 | 5/2013 | Ofek et al. |
| 8,549,105 | B1 | 10/2013 | Nourse et al. |
| 8,660,541 | B1 | 2/2014 | Beresniewicz et al. |
| 8,688,367 | B2 | 4/2014 | Mauderer |
| 8,788,587 | B2 | 7/2014 | Balassanian et al. |
| 8,831,882 | B1 | 9/2014 | John et al. |
| 9,080,872 | B2 | 7/2015 | Tarnok |
| 9,110,573 | B2 | 8/2015 | Thompson |
| 9,212,918 | B1 | 12/2015 | Newlin et al. |
| 9,305,107 | B2 | 4/2016 | Siliski et al. |
| 9,323,855 | B2 | 4/2016 | Hochmuth et al. |
| 9,881,590 | B2 | 1/2018 | Ma et al. |
| 9,940,008 | B2 | 4/2018 | Tolia et al. |
| 10,438,308 | B2 | 10/2019 | Prichard et al. |
| 11,481,091 | B2 | 10/2022 | Ho et al. |
| 2003/0083811 | A1 | 5/2003 | Demir et al. |
| 2004/0029594 | A1 | 2/2004 | Brandes et al. |
| 2004/0125121 | A1 | 7/2004 | Pea et al. |
| 2004/0204063 | A1 | 10/2004 | Van Erlach |
| 2005/0043880 | A1 | 2/2005 | Yamane et al. |
| 2005/0114019 | A1 | 5/2005 | Umezu et al. |
| 2005/0171685 | A1 | 8/2005 | Leung et al. |
| 2005/0270299 | A1 | 12/2005 | Rasmussen et al. |
| 2006/0129528 | A1 | 6/2006 | Miyamoto et al. |
| 2006/0189325 | A1 | 8/2006 | Kim et al. |
| 2007/0080830 | A1 | 4/2007 | Sacks |
| 2007/0106455 | A1 | 5/2007 | Fuchs |
| 2007/0110316 | A1 | 5/2007 | Ohashi |
| 2007/0155402 | A1 | 7/2007 | Van Erlach |
| 2007/0191029 | A1 | 8/2007 | Zarem et al. |
| 2008/0010605 | A1 | 1/2008 | Frank |
| 2008/0052638 | A1 | 2/2008 | Frank et al. |
| 2008/0059452 | A1 | 3/2008 | Frank |
| 2008/0059889 | A1 | 3/2008 | Parker et al. |
| 2008/0102857 | A1 | 5/2008 | Kim |
| 2008/0147824 | A1 | 6/2008 | Hendrey |
| 2008/0238941 | A1 | 10/2008 | Kinnan et al. |
| 2008/0270938 | A1 | 10/2008 | Carlson |
| 2008/0298342 | A1 | 12/2008 | Appleton et al. |
| 2009/0043497 | A1 | 2/2009 | Tashev et al. |
| 2009/0113296 | A1 | 4/2009 | Lacy et al. |
| 2009/0132469 | A1 | 5/2009 | White et al. |
| 2009/0132941 | A1 | 5/2009 | Pilskalns et al. |
| 2009/0153492 | A1 | 6/2009 | Popp |
| 2009/0177390 | A1 | 7/2009 | Mikusiak |
| 2009/0187464 | A1 | 7/2009 | Bai et al. |
| 2009/0234847 | A1 | 9/2009 | Homma et al. |
| 2009/0235176 | A1 | 9/2009 | Jayanthi et al. |
| 2010/0106397 | A1 | 4/2010 | Van Essen |
| 2010/0118025 | A1 | 5/2010 | Smith et al. |
| 2010/0145936 | A1 | 6/2010 | Grinstein et al. |
| 2010/0145947 | A1 | 6/2010 | Kolman et al. |
| 2010/0146436 | A1 | 6/2010 | Jakobson et al. |
| 2010/0179748 | A1 | 7/2010 | Choi et al. |
| 2010/0293035 | A1 | 11/2010 | Athsani et al. |
| 2011/0007076 | A1 | 1/2011 | Nielsen et al. |
| 2011/0047509 | A1 | 2/2011 | Arrasvuori |
| 2011/0050732 | A1 | 3/2011 | Arrasvuori |
| 2011/0098917 | A1 | 4/2011 | LeBeau et al. |
| 2011/0137881 | A1 | 6/2011 | Cheng et al. |
| 2011/0153186 | A1 | 6/2011 | Jakobson |
| 2011/0161875 | A1 | 6/2011 | Kankainen |
| 2011/0224896 | A1 | 9/2011 | Napieraj |
| 2011/0288762 | A1 | 11/2011 | Kuznetsov |
| 2011/0304531 | A1 | 12/2011 | Brooks |
| 2012/0054035 | A1 | 3/2012 | Nam et al. |
| 2012/0078502 | A1 | 3/2012 | Bolin |
| 2012/0136895 | A1 | 5/2012 | Johnson |
| 2012/0166281 | A1 | 6/2012 | Sartipi |
| 2012/0262552 | A1 | 10/2012 | Zhang et al. |
| 2012/0265434 | A1 | 10/2012 | Woodard et al. |
| 2013/0035853 | A1 | 2/2013 | Stout et al. |
| 2013/0055163 | A1 | 2/2013 | Matas et al. |
| 2013/0073988 | A1 | 3/2013 | Groten et al. |
| 2013/0080594 | A1 | 3/2013 | Nourse et al. |
| 2013/0085659 | A1 | 4/2013 | Bekaert |
| 2013/0091452 | A1 | 4/2013 | Sorden et al. |
| 2013/0097197 | A1 | 4/2013 | Rincover et al. |
| 2013/0131986 | A1 | 5/2013 | Van Seggelen et al. |
| 2013/0132375 | A1 | 5/2013 | Jones et al. |
| 2013/0151645 | A1 | 6/2013 | Siliski et al. |
| 2013/0166640 | A1 | 6/2013 | Wilfert et al. |
| 2013/0169579 | A1 | 7/2013 | Havnor et al. |
| 2013/0253831 | A1 | 9/2013 | Langendorff |
| 2014/0053077 | A1 | 2/2014 | Unnikrishnan et al. |
| 2014/0274145 | A1 | 9/2014 | Cronin et al. |
| 2014/0358438 | A1 | 12/2014 | Cerny et al. |
| 2014/0359510 | A1 | 12/2014 | Graf et al. |
| 2015/0111603 | A1 | 4/2015 | Rivard et al. |
| 2015/0187107 | A1 | 7/2015 | Vander Mey et al. |
| 2015/0193819 | A1 | 7/2015 | Chang |
| 2016/0084667 | A1 | 3/2016 | Ziezold et al. |
| 2018/0112995 | A1 | 4/2018 | Bortolussi et al. |

OTHER PUBLICATIONS

Jungert, "Towards a visual query language for an object oriented geographical information system," Proceedings of the 1990 IEEE Workshop on Visual Languages, Skokie, IL, USA, 1990, pp. 132-137, doi: 10.1109/WVL.1990.128394. (Year: 1990).

Postal Address Lookup with Google Maps (2013). Retrieved from the Internet on Jul. 29, 2013: <URL:http://ctrlq.org/maps/address/>.

(56) References Cited

OTHER PUBLICATIONS

Tian and K. Liu, "Electronic Map Data Processing and Optimization," 2010 International Conference on E-Product E-Service and E-Entertainment, Henan, 2010, pp. 1-3, doi: 10.1109/ICEEE.2010.5661625. (Year: 2010).

METHOD AND APPARATUS FOR SUPPORTING USER INTERACTIONS WITH NON-DESIGNATED LOCATIONS ON A DIGITAL MAP

CROSS-REFERENCE TO RELATED APPLICATIONS

The present application is a continuation of and claims priority to U.S. application Ser. No. 17/942,757, filed Sep. 12, 2022, entitled "Method and Apparatus for Supporting User Interactions with Non-Designated Locations on a Digital Map," which is a continuation of and claims priority to U.S. application Ser. No. 13/895,315, filed May 15, 2013, entitled "Method and Apparatus for Supporting User Interactions with Non-Designated Locations on a Digital Map," the disclosures of each of which is incorporated herein by reference in its entirety for all purposes.

FIELD OF TECHNOLOGY

The present disclosure relates generally to allowing users to retrieve useful information associated with any location on a digital map, regardless of whether the location had previously been designated as a location of interest.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A wide variety of computing devices, including many desktop and portable devices, support software modules that display interactive digital maps ("mapping software modules"). These software modules can operate in applications designed specifically to provide digital maps, or in other applications such as web browsers, for example. In general, mapping software modules can run on desktop, laptop, and tablet computers, mobile phones, car navigation systems, hand-held global positioning system (GPS) units, etc. In addition to displaying interactive digital maps, mapping software modules can display results of geospatial searches and provide other geolocated content.

In addition to street and highway locations, these digital maps may provide a variety of other relevant information. For example, a digital map may display the locations of certain places and attractions (e.g., restaurants, bars, stores, parks, historical locations, landmarks, etc.) that may be interesting to a user and may designate these locations using special icons or other markers. When these icons or markers are selected by a user (e.g., via a mouse click or finger tap, finger press, etc.), the map may display a card or other graphic that contains further information about the designated location and/or links that the user may access to learn more about the designated location. In a general sense, these cards or other graphic information are referred to as place page data or simply place pages.

Digital maps, however, are limited in that a user can only interact with a small number of predefined locations in this manner. That is, the majority of locations on a digital map are typically not designated as locations of interest, as storing predefined location information about every location on a map may not be practical for a map provider. Therefore, map providers typically only store and provide place information for a small number of the locations on a digital map. Currently, if a user wishes to learn more about a non-designated location, there is no manner to do so without leaving the mapping application or using other resources, which may be inconvenient or even impossible.

SUMMARY

Features and advantages described in this summary and the following detailed description are not all-inclusive. Many additional features and advantages will be apparent to one of ordinary skill in the art in view of the drawings, specification, and claims hereof. Additionally, other implementations may omit one or more (or all) of the features and advantages described in this summary.

In one embodiment, a computer-implemented method for use in a computing device having a user interface for supporting user interactions with locations on a digital map displayed on the user interface includes receiving selection data that specifies a user selected location on the digital map displayed on the user interface of the computing device and determining whether the selected location has a set of predetermined informational data associated with the selected location. Moreover, in response to determining that the selected location does not have a set of predetermined informational data associated with the selected location, the method obtains a set of informational data describing the selected location by querying at least one of a plurality of information data sources and then displays a visual representation of the generated set of informational data on the user interface illustrating the digital map.

In another embodiment, a computer-implemented method for use in a computing device having a user interface for supporting user interactions with any location on a digital map receives data that specifies a user-selected location on the digital map and determines if the user-selected location is a location having a predetermined set of informational data associated therewith. The method then displays a visual representation of the predetermined set of informational data on the user interface in a first format when the user-selected location is a location having a predetermined set of informational data associated therewith. Alternatively the method generates a set of informational data describing the user-selected location based on data received from at least one of a plurality of informational data sources and displays a visual representation of the generated set of informational data in the first format on the user interface when the user-selected location is not a location having a predetermined set of informational data associated therewith. The method may also automatically display additional map data not previously shown on the digital map in the vicinity of the user-selected location upon determining that the user-selected location does not have a set of predetermined informational data associated therewith. This additional map information may be provided to refocus the displayed map around the selected location by providing, for example, one or more map labels (e.g., road names), point of interest icons or traffic indications in the vicinity of the user-selection location. This additional map data may be obtained from, for example, a map database as map data associated with a zoom level of map data other than a zoom level of map data currently being displayed on the user interface as the digital map or from other sources, such as traffic data sources. Additionally, the informational data sources from which the informational data is obtained for the user-selected location may include a source of stored user photographs, a streetview data source, an address data source and a social networking data source, etc.

In another embodiment, a computer device includes one or more processors, a user display coupled to the one or more processors and a computer readable memory that stores routines for execution on the one or more processors. In this embodiment, the memory may include a first routine that, when executed on the one or more processors, detects a user interaction with a digital map displayed on the user interface to determine a user-selected location on the digital map and a second routine that, when executed on the one or more processors, determines a set of informational data for the user-selected location. Here, the second routine obtains a predetermined set of informational data associated with the user-selected location when a predetermined set of informational data has been stored for the user selected location. However, the second routine obtains a newly generated set of informational data pertaining to the user-selected location when a predetermined set of informational data has not been stored for the user selected location and generates this set of informational data based on informational data stored in at least one of a plurality of informational data sources. Moreover, a third routine displays a visual representation of the obtained set of informational data in a first format on the user display regardless of whether the informational data was pre-stored or was generated.

In yet another embodiment, a computer-implemented method is adapted for use in a computing device communicatively coupled to a client device that has a user interface for supporting user interactions with any location on a digital map displayed on the user interface of the client device. The method includes receiving data that specifies a user-selected location on the digital map displayed on the user interface of the client device and determining if the user-selected location is a location having a predetermined set of informational data associated therewith. If the user-selected location is determined to be a location having a predetermined set of informational data associated therewith then the method obtains the predetermined set of informational data from a database. Otherwise, the method generates a set of informational data describing the user-selected location by querying at least one of a plurality of informational data sources and compiling informational data from the at least one of the plurality of informational data sources associated with the user selected location and then selecting informational data from the compiled informational data as an obtained set of informational data for the user-selected location. The method then provides the obtained set of informational data to the client device via a communication network for display on the user interface device in a first format.

Figures 1A, 1B:
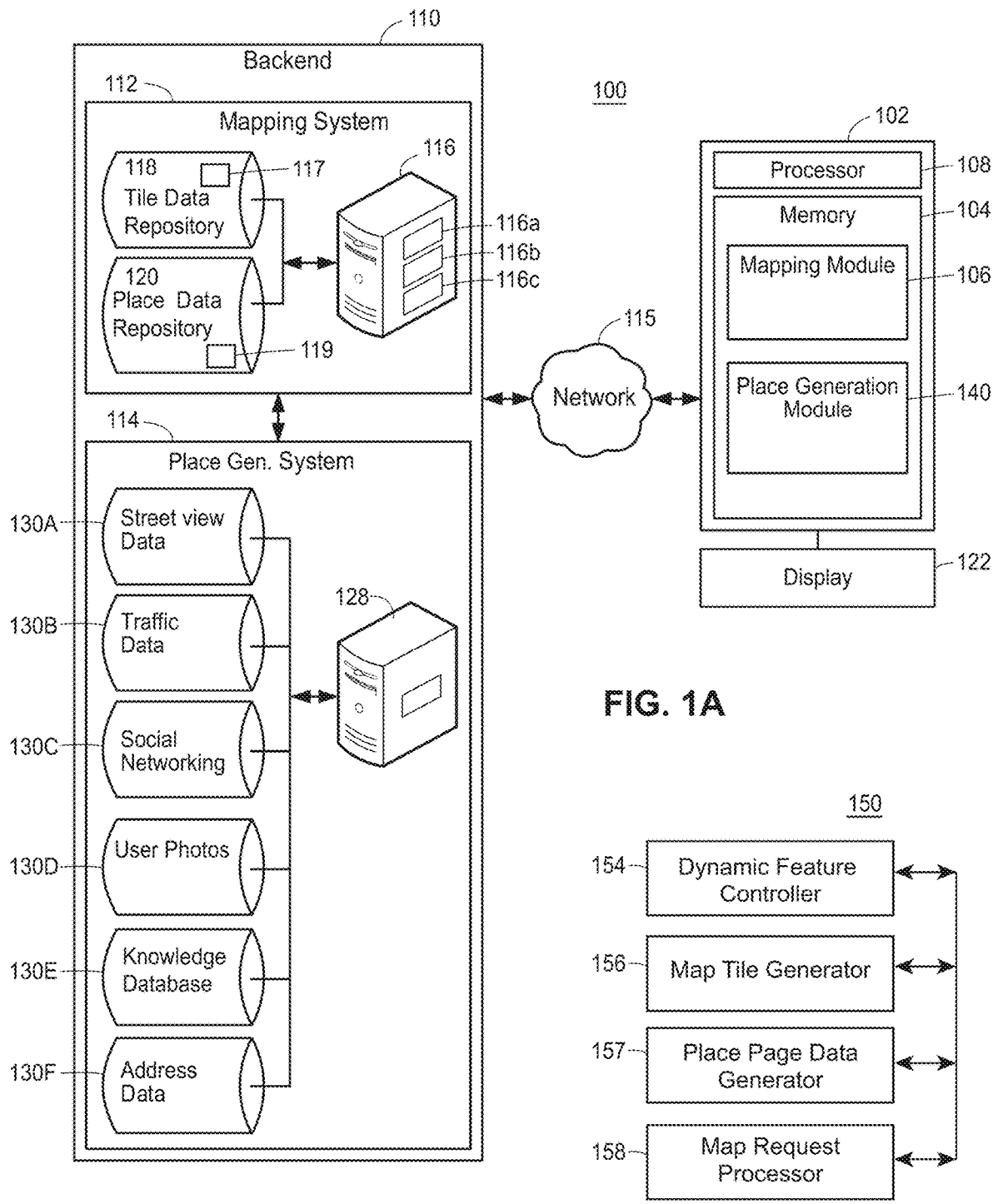
FIG. 1A is a high-level block diagram of a system that allows a user to interact with any location on a digital map and presents the user with information about the location.
FIG. 1B is a high-level block diagram of a map controller included in the system for allowing a user to interact with any location on a digital map and presenting the user with information about the location.

The figures depict various implementations for purposes of illustration only. One skilled in the art may readily recognize from the following discussion that alternative implementations of the structures and methods illustrated herein may be employed without departing from the principles described herein.

DETAILED DESCRIPTION

Implementations of systems and methods for allowing a user to interact with any location on a digital map and presenting the user with information about the location are discussed below. In addition to presenting a user with information corresponding to pre-designated locations indicated on the map, the disclosed systems and methods allow a user to select points on the map at which no marker, icon, label or any other indicator is displayed and to receive the same types of information that he or she would have received if he or she had selected a pre-designated location.

Digital maps may display the locations of certain places and attractions (e.g., restaurants, bars, stores, parks, historical locations, landmarks, etc.) that may be interesting to a user and may designate these locations using special icons or other markers. When a user interacts with these locations (e.g., via a mouse click, finger tap, long press), the map may display a predetermined place page in the form of a card or other graphic that contains further information about the designated location and/or links that the user may access to learn more about the designated location. More specifically, the place page data may be displayed, for example, on a pop-up card or other indicator and may include photos of a location, the address of the location, streetview imagery for that location, traffic conditions near the location, social content associated with the location, facts about that location, user photographs, etc. However, in these cases, the place page data or card is predetermined in that the data or at least the types of presented as part of the card has been predetermined. Moreover, the existence of the place page or card has been pre-established only for specific locations at which a map provider believes that users will wish to see additional information.

However, using systems and methods described below, a user may also interact with non-designated locations and receive information similar to that which she would receive had she interacted with a designation location. That is, a user may, for example, click or tap on any location on the map, whether or not the location is designated via a particular icon or indicator, and the map application may display a pop-up card or other indicator including information similar to that described above, even where no such information, place page or card has been pre-established. Further, according to certain implementations, the same type of user interaction will work for both designated and non-designated locations. That is, if a user clicks, taps, etc. on a designated location to bring up a pop-up card or other indicator, the same type of click, tap, etc. will be operative to bring up a pop-up card or other indicator for a non-designated location. In other implementations, a user may use different interactions for designated and non-designated locations.

As described below, if a predefined place page does not already exist for a selected location, a variety of data sources (e.g., remote and/or local databases) may be analyzed to generate a place page which may then be presented on the fly to a user on the digital map as a place page or card. The generated place page may appear similar to and contain similar information as a predefined place page for pre-designated locations. In certain implementations, the generated place page may be generated "on-the-fly" such that a user cannot distinguish between predefined place pages for designated locations and place pages that did not exist for a given location before the user selected that location.

Additionally, user interactions with the map may lead to a "refocusing" of the map in that places and attractions in the vicinity of the user interaction that were not previously shown on the map may be displayed in response to the interaction. That is, according to certain implementations, after a user clicks on or taps on or otherwise selects a given map location, in addition to displaying a place page describing the location, the map may also display the names of streets, buildings, attractions, etc. and may provide additional display features that were not previously displayed, without changing the zoom level or viewport focus of the map. This refocusing action provides additional information on the map that is related to the selected location and thus "focuses" the map around the selected map location.

FIG. 1A is a high-level block diagram that illustrates a system 100 for allowing a user to interact with any location on a digital map and presenting the user with information about the location. Although the example system 100 is described below as including a plurality of peripherals, interfaces, chips, memories, etc., one or more of those elements may be omitted from other example systems used to implement and execute the example system 100 discussed in further detail below. Also, other components may be added.

Generally, the client computing device 102 may include a memory 104 storing a mapping module 106 that is executed by a processor 108. In certain implementations, the client computing device 102 may also include a place generation module 140. More generally, the client computing device 102 may for example, take the form of a personal computer, a smart phone, a tablet computer, or other computing device including devices with a GPS transceiver and being capable of executing the various modules, instructions, etc., described herein.

The mapping module 106 may communicate with back-end components 110 including a mapping system 112 and a place generation system 114 via a network connection such as the Internet 115 or other type of networks (e.g., LAN, a MAN, a WAN, a mobile, a wired or wireless network, a private network, or a virtual private network, etc.) in order to allow a user to interact with any location on a digital map and present the user with information about the location. While the system 100 is illustrated in FIG. 1A as including the place generation system 114 as a backend component, the components and functions of the place generation system 114 described herein may also be incorporated on the client computing device 102. For example, the place generation system 114 may be implemented as computer-executable instructions of the mapping module 106 or as a separate place generation module 140.

A mapping system server 116, which may be in the form of one or more servers, may send and receive map tile data 117 from a map tile data repository 118, and place page data 119 from a place page data repository 120 that corresponds to predefined geographical features of the map tile data 117. The mapping system server 116 may also send and receive newly generated place page data in response to a user interaction with a map location that does not have predefined place data in conjunction with place page generation server 128 as described below. In some implementations, the mapping system 112 and the mapping system server 116 may send computer-executable instructions and data to allow the mapping module 106 to render a digital map in a display component 122 of the client device 102. While using the client device, 102, a user may select a geographical location on the digital map and cause the mapping module 106 to execute instructions to display a place page about the selected location on the map.

In some implementations, the selected location may correspond to a location for which a predefined place page about the location already exits. In these implementations, the mapping module 106 may communicate with the map generation server 116 to retrieve the place page from place page data repository 120. As will be described below in more detail, retrieving the place page from the place page data repository may first require determining whether the selected location corresponds to a location for which a predefined place page already exists. In implementations in which a predefined place does exist, mapping module 106 may then communicate with map generation server 116 to find the place page, retrieve the place page, and then display the pace page on a digital map.

In other implementations, the selected location does not correspond to a location for which a predefined place page about the location already exits. In these implementations, mapping module 106 may communicate with place page generation server 128 to generate a place page for the selected location that can be displayed on the digital map. As with retrieving a predefined place page, generating a new place page for a selected location may first include determining whether the selected location corresponds to a designated location for which a predefined place page already exists. In implementations in which a predefined place does not exist at or near the selected location, mapping module 106 may communicate with place page generation server 128 to generate a place page for the selected location that can be displayed on the digital map. As will be discussed further below, generating a place page may involve determining one or more nearby addresses corresponding to the selected location and determining whether a designated location exists at that address on a different map zoom level. Additionally, as discussed above, regardless of whether a designated location exists or not, in certain implementations, the same type of user interaction will work for both designated and non-designated locations. That is, if a user clicks, taps, etc. on a designated location to bring up a pop-up card or other indicator, the same type of click, tap, etc. will be operative to bring up a pop-up card or other indicator for a non-designated location. In other implementations, a user may use different interactions to bring up information for designated and non-designated locations. For example, in certain implementations, a user may use a short tap or click to bring up a pop-up card or other indicator describing a designated location, while he or she may use a long tap or click to bring up a pop-up card or other indicator describing a non-designated location.

If the designated location does not exist at the selected location for any map zoom level, place page generation server 128 may access one or more of data sources, such as street view repository 130A, traffic data repository 130B, social networking repository 130C, photo repository 130D, knowledge repository 130E, and/or address repository 130F and may then generate a place page based on the accessed data. Place page generation server 128 may use some or all of the retrieved data to generate the place page, depending on the types and amount of retrieved data. The generated place page may appear similar to and contain similar types of data as a predefined place page stored in place data repository 120, such that the user has a similar experience regardless of whether the user has selected a predefined location or a location for which no predefined place page existed. Additionally, in certain implementations, a user may be able to perform actions on, and/or edit the generated place page. For example, in certain implementations, a user may highlight (e.g., "star") a page as a favorite, save the page, or share the page with one or more friends. The user may also be able to report a problem or inaccuracy regarding the generated place page information, report traffic conditions near the location, and/or add his own photos to the generated place page. Some or all of the user edits to the generated place page may be save locally or on a remote database.

In an implementation, the system 100 may store and retrieve map and location data on various servers. For example, the mapping system server 116 may include a processor 116*a* and a computer-readable memory 116*b* that stores a map controller 116*c* in the form of computer instructions, for example, that may be executable on the processor 116*a* directly (e.g., as compiled code) or indirectly (e.g., as a script interpreted by another application executing on the processor 116*a*). The computer-readable memory 116*b* may include volatile memory to store computer instructions and data on which the computer instructions operate at runtime (e.g., Random Access Memory or RAM) and, in an implementation, persistent memory such as a hard disk, for example. In an implementation, the map controller 116*c* includes a dynamic feature controller 154 (FIG. 1B) that generates vector data for various map elements that are provided as map content to the client device 102. As used herein, a map feature (or simply feature) may correspond to an individual map element such as a building or an aggregation of several map elements such as several buildings, a park, and several pedestrian paths of a college campus. In general, a map feature may be described using vector data. Predefined place page data 119 may include data that describes business and/or administrative aspects of the map tile features including textual information, images, data feeds, web content for the map features (i.e., businesses, landmarks, etc.), etc. As mentioned above and discussed in further detail below, in response to user interactions with the map, the system 100 may generate place page data for locations on a map without predefined data.

In some implementations, the mapping module 106 receives vector data that specifies both graphical characteristics of map features as well as place page data that describes these features. The place page data may be predefined or generated in response to a user request. Vector data specifies the map features as geometric shapes using mathematical descriptions of points and paths connecting the points. For example, rather than specifying each pixel that makes up a raster image of a line segment, vector data may specify the two endpoints of the line segment and indicate that the two endpoints are connected by a straight line. The mapping module 106 then may apply the received place page data as appropriate to the specified line segment, so that the line segment is displayed with a particular title, description, etc. As another example, the vector data may specify the contour of a building, and the corresponding place page data may specify the name, description, web page, contact information, address, etc., of the building. In other words, rather than receiving raster images from the map server 116, the mapping module 106 may receive instructions for drawing a map image on an output device 122 of the client computing device 102 and execute the instructions to generate a raster map image. In some cases, however, vector data also may include raster images as certain component elements that cannot be easily represented in a vector format.

For simplicity, the client device 102 is illustrated with a single processor 108 to execute various modules stored in the device memory 104, as described herein. The client device 102 in other implementations may include additional processing units (not shown) such as a graphics processing unit (GPU) configured to facilitate image rendering on the output device 122, for example. Further, the mapping module 106 may utilize a library of graphics functions for efficiently generating a map image as well as place page data, or place page data alone. For example, the memory 104 may store a plugin, such as an OpenGL® or Direct3D® library, having functions for rendering graphics which various applications executing on the client 102, including the mapping module 106, may access via an application programming interface (API). In another implementation, the memory 104 stores a plugin particularly suitable for browser applications, such as WebGL®, for example. Also, in some implementations, the memory 104 stores additional software components that facilitate efficient rendering of images and place page data via the output device 122. For example, the memory 104 may store an Adobe® Flash® plugin or an O3D plugin.

Now referring to FIG. 1B, the map controller 116*c* as described above may perform various mapping functions as part of the generation of a digital map. Although the map controller 116*c* was described above as operating as a module in the memory of the mapping system server 116 in FIG. 1A, in other implementations, the map controller 116*c* may operate as a module in the memory of the client computing device 102 or in the server 128 of FIG. 1A, for example. Optionally, the various functions may be split among the client computing device 102, the server 116, and the server 128. According to an implementation, the map data controller 116*c* is implemented as a set of instructions that are stored on a computer-readable medium and executable on one or more processors.

According to an implementation, the map controller 116*c* includes a dynamic feature controller 154, a map tile generator 156, a place page data controller 157, and a map request processor 158. The map request processor 158 may be configured to process requests from client devices, such as the client device 102, for map data 117, place page data 119, and/or new place page data corresponding to user-selected geographic locations. Each request may correspond to a single electronic message or a series of electronic messages, depending on the scenario and/or implementation. For example, the map request processor 158 may receive a request for map data corresponding to a two-mile-wide region centered at latitude 41° 52' 43" and longitude −87° 38' 11". The map request processor 158 may also receive a request for place page data corresponding to a particular location within that region. The request may also indicate a zoom level for which map data is being requested which determines an amount of map tile data 117 and place page data that will be returned by the mapping system 112. Depending on the scenario (i.e., requesting map tile and place page date together or separately), the map request processor 158 may receive a request for map data and a request for place page data in a single electronic message, e.g., a single HTTP message, or separately in respective electronic messages.

After the map request processor 158 receives a request for map data 117 and/or place page data from a client device, the map controller 116c provides appropriate data to the client device via one or more electronic messages. In some implementations, the map request processor 158 may include instructions to determine what type of data is being requested and execute a function call to one or more of the map tile generator 156 or the place page data controller 157 to retrieve and/or generate the requested data from the appropriate data repository 118, 120, 130A-130E. The map tile generator 156 may include instructions to generate map data as a set of map tile descriptors, such that each map tile descriptor describes a map tile, i.e., a portion of a map image of a certain size (e.g., 256 by 256 pixels). The size of a geographic region represented by an individual map tile depends on the zoom level with which the map tile is associated, so that a single map tile at a lower zoom level illustrates a larger geographic area than a single map tile at a higher zoom level. The map tile generator 156 may generate each map tile descriptor according to a vector graphics format, and a client device, such as the client device 102 of FIG. 1A, may locally generate a raster image for each tile. The map tile generator 156 may retrieve the requested data from a map database such as the map tile database 118.

The place page data controller 157 may generate and/or retrieve place page data in conjunction with the response to the request for map data, or in response to a request for place page data alone. More specifically, in some implementations, the place page data generator 157 includes instructions to retrieve predefined place page data 119 from multiple entries of the place page data repository 120 that correspond to a requested geographic region. In other implementations, the place page data generator 157 may also include instructions to interact with place page generation server 128 if place page data for a selected location does not already exist in order to generate new place page data using repositories 130A-130F as discussed above and as will be discussed below in further detail.

When providing graphic map data to a client device, the map controller 116c may separate map tile data 117 from place page data. In some cases, the map controller 116c may provide vector data that describes map content without providing the corresponding place page data to the client device at the same time (if, for example, the client device already has the necessary place page data). Conversely, the map controller 116c may provide place page data without providing the vector data for graphical map content to which the place page data applies (for rendering a geographic region at a more detailed zoom level and using place page data that was sent with a previous request for the geographic region at a different zoom level, for example).

Further, in some scenarios, the map controller 116c provides vector data and place page data at the same time (e.g., in a same electronic message or a series of electronic messages). For example, when the map request controller 158 receives a request for map data and queries the map data repository 118 for map tile data 117, place page controller 157 queries the place page data repository 120 for predefined place page data 119 that corresponds to the geographical area of the requested map tile data 117. The amount of place page data corresponding to the requested map data 117 may depend on the zoom level with which the map tile is associated. For example, a single map tile at a lower zoom level illustrates a larger geographic area and, thus, corresponds to more label and predefined place page data 119 than a single map tile at a higher zoom level. In some implementations, the place page data generator 157 may query the place page data repository 120 for only the predefined place page data 119 that is visible at the zoom level of the requested map data 117. In other implementations, the place page data generator 157 may query the repository 120 for more data 119 that corresponds to other zoom levels than would be visible at the zoom level of the requested map data 117. The place page data generator 157 may then insert the retrieved data 119 in the vector containing the requested map tile data 117 or may send the data 119 separately from the map tile data 117. The client device 102 may locally rasterize the vector data for each tile including the data 117, may provide a link to the data 119 in the created map image, or may store the retrieved place page data 119 in a cached memory 124 of the device 102.

The dynamic feature controller 154 may be communicatively coupled to the map tile generator 156 and place page data controller 157 and be configured to determine which map elements are associated with the requested map data and generate vector-based or other descriptions of these map elements. For example, the dynamic feature controller 154 may determine that, in response to a request for map data corresponding to zoom level $Z_i$ for a certain geographic region, vector descriptors corresponding to interstate highways, large bodies of water, etc. must be generated, whereas in response to another request for map data corresponding to zoom level $Z_j$ for the same geographic region, additional vector data corresponding to local roads and buildings must be generated. Further, in some cases, the dynamic feature controller 154 generates different sets of vector data for different map types. For example, a terrain map may include map elements that are not included in a basic map for the same geographic region and zoom level.

Figure 2A:
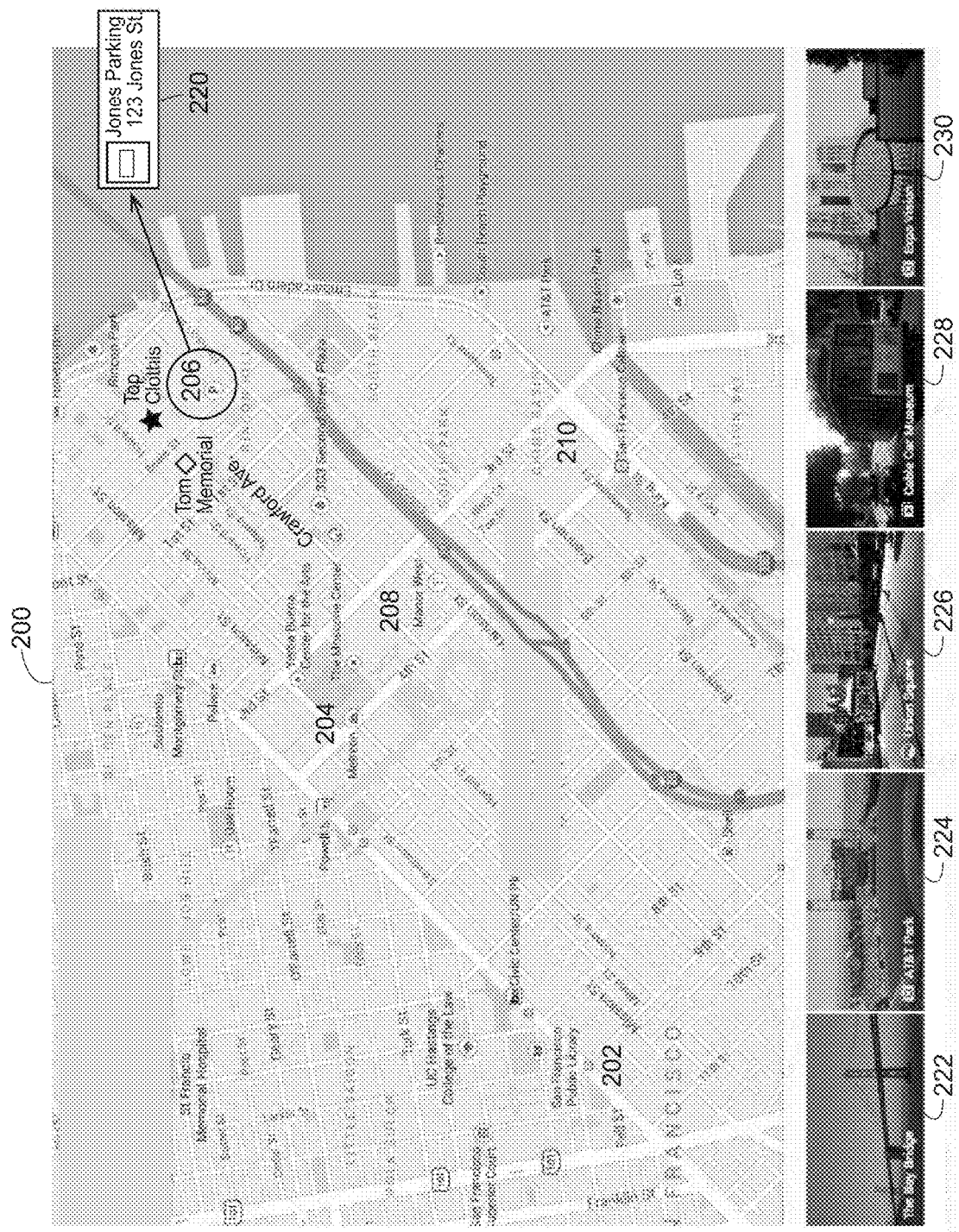
FIG. 2A is an exemplary screenshot of a map in which a user has selected a location with a predefined place page.

FIG. 2A is a screenshot of an exemplary map in which a user has selected a location with a predefined place page. A map 200 includes a number of features designated by markers indicating that they are places of interest, such as for example, San Francisco Public Library 202, Metreon 204, Parking Lot 206, Manor West 208, and China Basin Park 210. In addition to indicating that they represent places of interest, the markers indicate that they are interactive links which when clicked, tapped, etc. upon will cause the map to display a place page containing further information (e.g., photos of the location, facts related to the location, the address of the location, streetview imagery for the location, social networking data related to the location, etc.). Of course, although not explicitly shown in FIG. 2A, using systems and methods according to the present location, any location on the map is interactive and when clicked, tapped, etc. upon, will also cause the map 200 to display a place page containing further information about the particular interacted-with location. Further, in certain implementations, a user may use the same type of interaction to select a non-marked location as he or she would to select a designated location. For example, if a user clicks, taps, etc. a designated location to display a place page, the same type of click, tap, etc. will also allow him or her to display a place page for a non-designated location. In other implementations, however, a user may use a different type of interaction to select a designated location than he or she would to select a non-designated location. User interactions and place pages associated with non-marked or designated locations will be discussed further below with respect to FIG. 2B.

The map 200 also includes place page 220, and local interest pages 222, 224, 226, 228, and 230. As discussed above, place cards such as place page 220 may contain a variety of information relevant to a user-selected location (e.g., photos of the location, facts related to the location, the address of the location, streetview imagery for the location, social networking data related to the location, etc.). In certain implementations, the place page 220 may display a subset of information and contain links that a user may interact with to view further information about the selected location. While the place page 220 is illustrated in rectangular card format in the map 200, in other implementations, place cards may be displayed in other shapes, sizes, areas of the map with respect to the selected location, etc., as appropriate.

Further, in certain implementations, as illustrated in the map 200, one or more local interest pages 222, 224, 226, 228, and 230 will be displayed along with a place page in response to user interaction with a map. Local interest pages may present the user with images or other data listing other places of interest near the user selected location that the user may want more information about. While a number of local interest pages are shown in map 200 in response to a user selection, in other implementations, local interest pages are optional and may not be displayed.

Further, as mentioned above, according to the present methods and systems, in addition to displaying one or more place pages and/or local interest pages, user interactions with a location on map 200 may cause the data on the map to be "refocused" with respect to the user-selected location. That is, the map may show additional places of interest, street names, attractions, etc. that were not shown on the map prior to the user interaction. More specifically, certain labels, icons, street names, traffic conditions, etc. near the selected location that would normally only be displayed on higher zoom levels than the current zoom level may be displayed after the location has been selected by the user. For example, on map 200, a user has selected Jones Parking 206, and in response, map 200 displays traffic conditions on highway 80, along with exits that the user may use to access Jones Parking if the user wants to drive there. Additionally, although they would only normally be displayed at higher zoom levels, the names of certain local streets (e.g., Crawford Ave.) near the selected location and other attractions near the selected location that might interest the user (e.g., Top Clothis Tom Memorial, etc.)

Figure 2B:
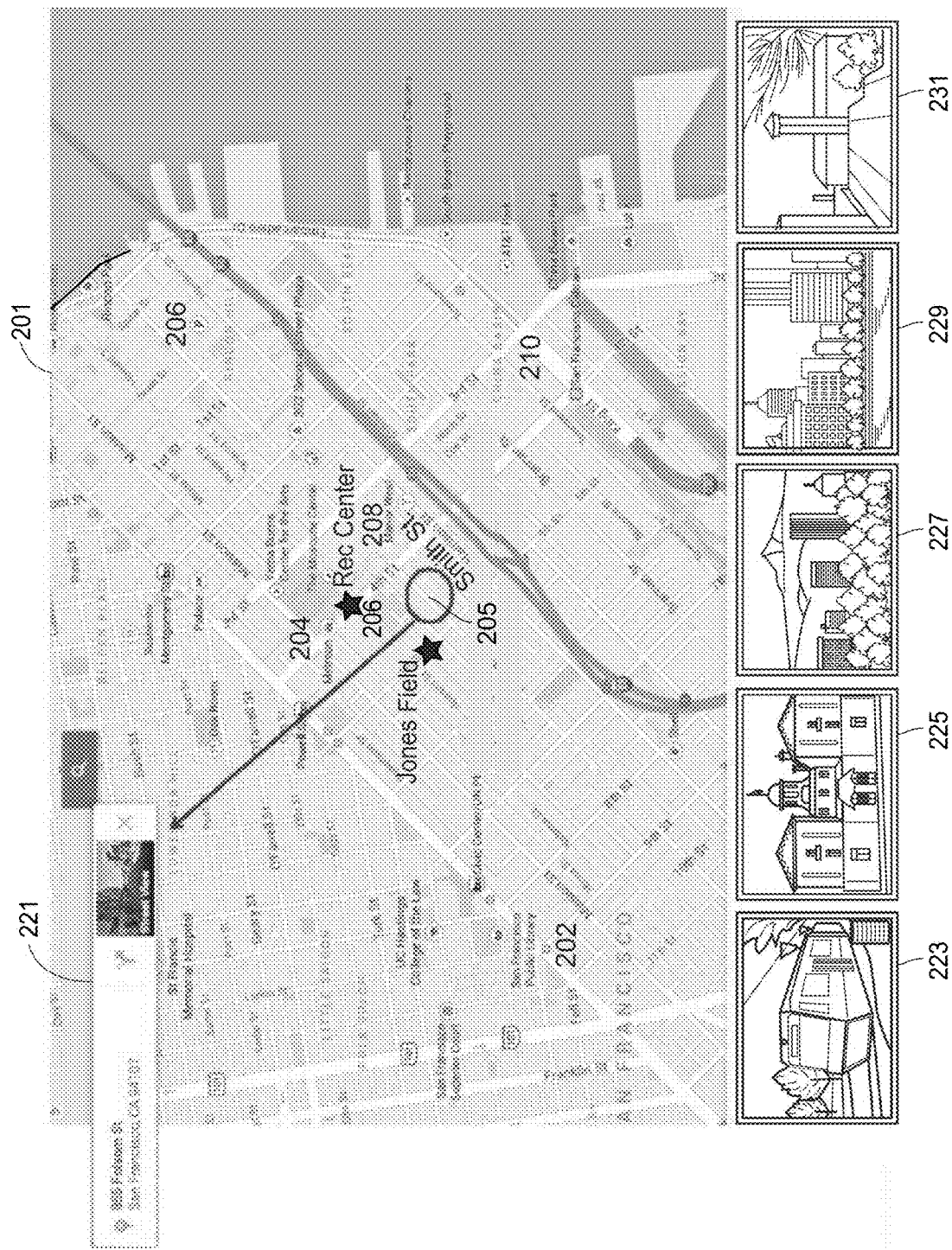
FIG. 2B is an exemplary screenshot of a map in which a user has selected a location without a predefined place page.

FIG. 2B is a screenshot of an exemplary map in which a user has selected a location that does not have a predefined place page. While map 201 also includes a number of features designated by markers indicating that they are places of interest and accordingly, have place pages (e.g., San Francisco Public Library 202, Metreon 204, Parking Lot 206, Manor West 208, and China Basin Park 210), in this implementation, a user has selected a non-designated location 205, in between 4$^{th}$ Street and 5$^{th}$ Street. As shown in the map 201, a place page 221 is displayed in response to the user selection. Like place page 220 of FIG. 2A, the place page 221 contains a variety of information relevant to the user-selected location (e.g., photos of the location, facts related to the location, the address of the location, streetview imagery for the location, social networking data related to the location, etc.). In certain implementations, the place page 221 may display a subset of information and contain links that a user may interact with to view further information about the selected location. Because the disclosed systems and methods allow a user to interact with any location on the map and receive place information, regardless of whether the selected location was designated as a location of interest and/or had a predefined place card or other information associated with the location, the place page 221 is implemented such that it appears similar to and contains similar types of information as the place page 220 in FIG. 2A.

Further, in certain implementations, the map 201 may display one or more local interest pages 223, 225, 227, 229, and 231 along with the place page in response to user interaction with a map. One or more of local interest pages 223, 225, 227, 229, and 231 may be similar to one or more of local interest pages 222, 224, 226, 228, and 230, depending in part on user interests and the proximity of the user-selected locations in each map.

As with the map 200, user interactions with a location on the map 201 may cause the data on the map 201 to be "refocused" with respect to the user-selected location. For example, on the map 200, a user has selected non-designated location 205, and in response, the map 201 displays traffic conditions on highway 4$^{th}$ Street and Fifth Street, which the user may use to access the location 205 if she wants to drive there. Additionally, although they would only normally be displayed at higher zoom levels, the names of local streets (Howard Street, Shipley Street, etc.) near the selected location and other attractions near the selected location that might interest the user (e.g., Rec Center, Jones Field.). Notably, because the map 200 and the map 201 have been refocused around different selected locations, different map features are displayed and hidden near the respective selected locations on the maps 200 and 201. Additionally, the map 201 includes local interest pages 223, 225, 227, 229, and 231 that present the user with images or other data listing other places of interest near the user selected location about which the user may want more information. As with the local interest pages shown on the map 200, in certain implementations, one or more of the local interest pages of map 201 are optional and may not be displayed.

As discussed above, in certain implementations, a user may be able to perform actions on, and/or edit the generated place page. For example, in certain implementations, a user may highlight (e.g., "star") a page as a favorite, save the page, or share the page with one or more friends. The user may also be able to report a problem or inaccuracy regarding the generated place page information, report traffic conditions near the location, and/or add his own photos to the generated place page. Some or all of the user edits to the generated place page may be save locally or on a remote database. The user may be also able to perform some or all of these actions on predefined place pages, such that the user-experience is again similar regardless of whether the user selected a location with a predefined place page or selected a location for which the place page was generated "on-the fly".

Figure 3:
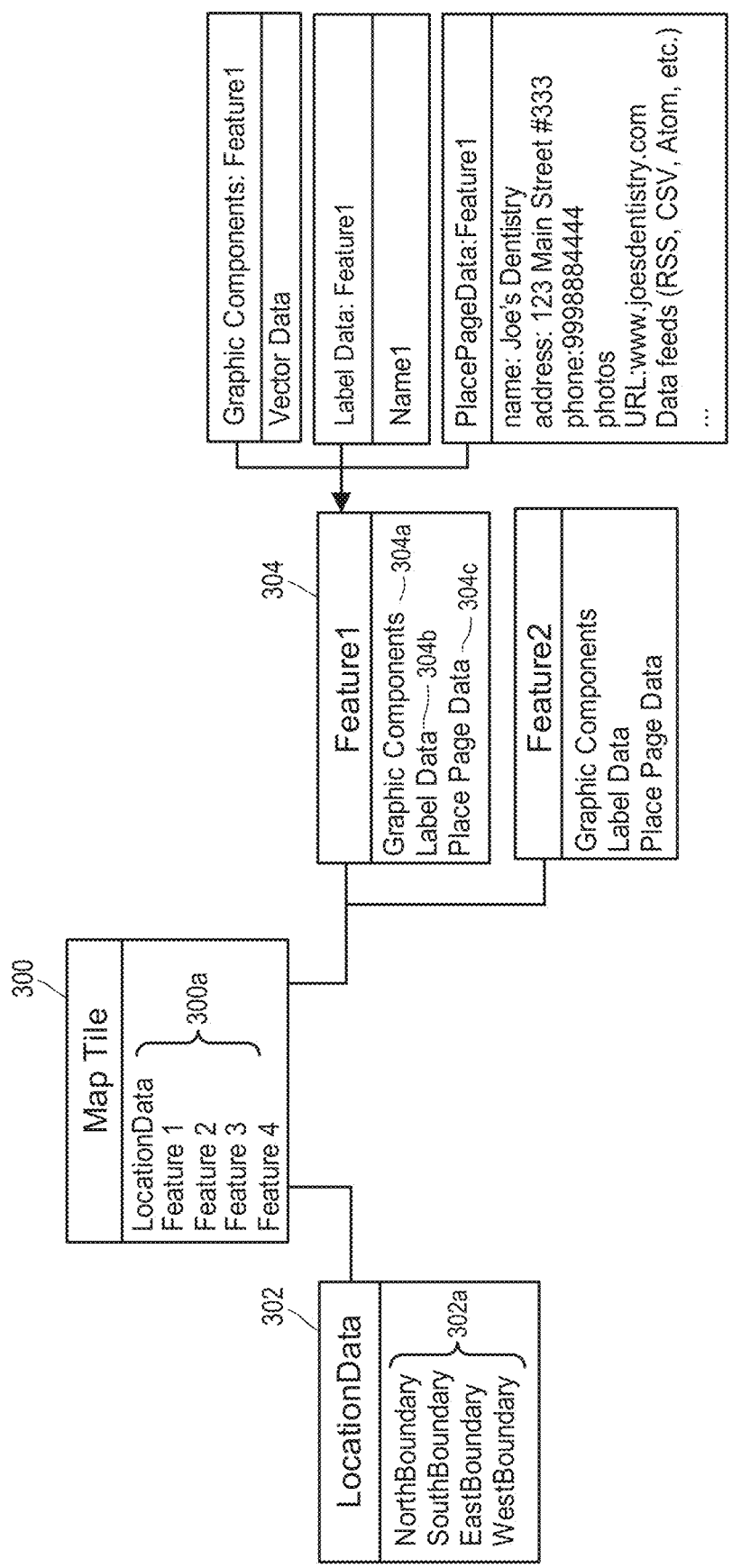
FIG. 3 is an exemplary data structure for place page data to be displayed on a digital map in the system of FIG. 1.

FIG. 3 illustrates one implementation of a high-level block diagram for place page data corresponding to map tile data. A map tile 300 may include a plurality of attributes 300a, for example, location data 202, and several predefined features 304 (e.g., roads, buildings, landmarks, or other places of interest). The location data 302 may include particular coordinates 302a that describe the specific geographic location of the map tile 300 that represents a geographic area. For example, in some implementations, the location data 302 includes a plurality of boundaries 302a such as a north, south, east, and west boundary for the map tile 300. The location data 302 may include latitude and longitude coordinates as determined by a global positioning system (GPS) or other system that is able to determine where the geographic location or physical object is located.

Some or all of the predefined features 304 of a map tile 300 may include graphic components 304a and logical links to predefined place page data 304b. Of course, as discussed above, according to the disclosed systems and methods, a user may interact with map elements that do not have predefined place pages associated therewith and still receive place page information. The place page may be generated after the user interaction, but will appear similar to and contain similar information as predefined place pages. Graphic components 304a for each predefined feature 304 may include vector data 304a retrieved from the map tile data repository 118 to illustrate a predefined feature 304 within the map tile as rendered by the mapping module 106. Label data 304b for each predefined feature 304 may include text data such as a name, title, or other designation 304b corresponding to a predefined feature 304 as retrieved from the place page data repository 120 or other source. Place page data 304c for both predefined features 304 and non-features on a map may include text, images, web and data feeds, as well as other information corresponding to a map element. Each predefined feature 304 may also include location data 302. The location data for a predefined feature 304 may include a GPS coordinate, a position within the boundaries 302a of the map tile 300, etc.

The place page data 304c may include various groups of information that describe characteristics of the predefined features 304 and other elements within a map tile 300. In some implementations, the information 304c includes listing information for businesses, points of interest, shopping centers, parks, etc., that are graphically represented within the map tile 300. The information 304c may also include specifications and other information describing the history of the object, physical specifications, etc. For example, the information 304c may include several features that include an icon, location, and data 304c for businesses, points of interest, etc., within the map tile 300. Place page data 304c may include text, photos, and other data to render a web page including information from various web resources that describes a particular listing represented by a predefined feature 304, such as an icon or other graphic item, or any other element displayed within the map tile 300. As discussed with respect to FIGS. 2A and 2B, place cards may be presented shown in rectangular card format or in any other shapes, sizes, areas of the map with respect to the selected location, etc. as appropriate. Further, both predefined place cards and place cards generated in response to a user selection may appear similar and contain similar types of information, such that a user cannot distinguish between the cards, except with respect to the location-specific information the cards convey.

Figure 4:
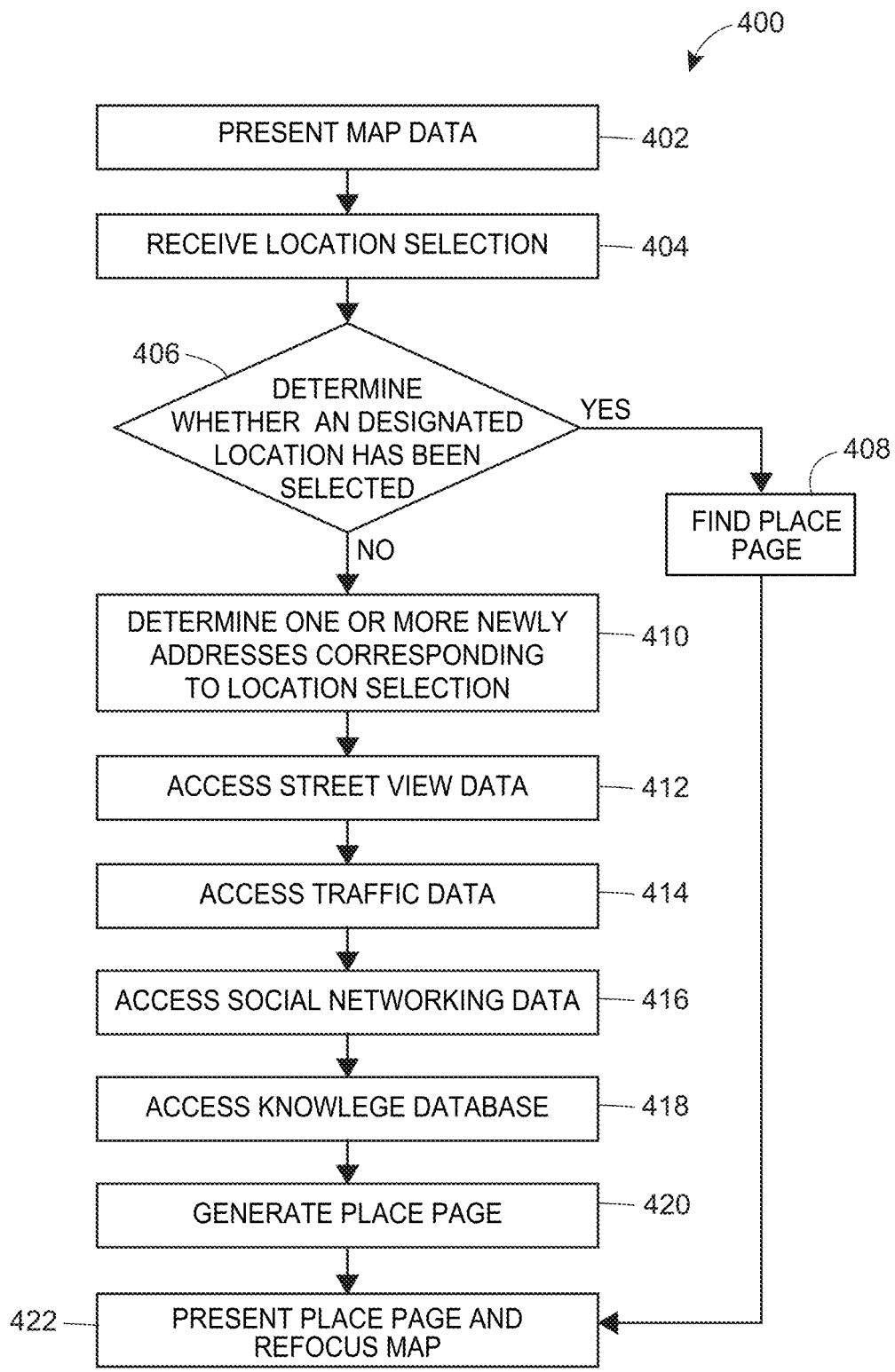
FIG. 4 is an exemplary flow chart of one method for allowing a user to interact with any location on a digital map and presenting the user with information about the location as described herein.

FIG. 4 is a flow diagram of an example method 400 for allowing a user to interact with any location on a digital map and presenting the user with information about the location. The method 400 may include one or more blocks, modules, functions or routines in the form of computer-executable instructions that are stored in a tangible computer-readable medium and executed using a processor 108 of the client device 102 (e.g., a desktop computer, laptop computer, smart phone, tablet computer, mobile computing device, or other personal computing device, as described herein) or one or more servers 116, 128. The method 400 may be included as part of modules in a computing environment for system 100 as described above with respect to FIG. 1. For example, the method 400 may be part of a backend map controller 116c, or a mapping module 106. The method 400 may execute at either the frontend 102 or the backend 110. In certain implementations, the method 400 may, of course, be utilized with other objects and user interfaces.

At a block 402, a system presents map data to a user. The map data may include geographical elements as well as map features indicating predefined features (e.g., roads, buildings, landmarks, or other places of interest). The map data may be interactive in that a user can select any location on the map using predefined gestures (e.g., a finger tap, long press, mouse click, etc.)

At a block 404, a system receives a user's location selection. As discussed above, in different implementations, a user may interact with the digital map using a variety of predefined gestures (e.g., a finger tap, long press, mouse click, etc.) and using these gestures, a user may select any location on the map. The selected location may correspond to a map location with a predefined place page or a location without a predefined place page. In certain implementations, selected location data may be received as terms of x-y coordinates, which define a relative position on the displayed map and/or a given tile on the map and may be used to interpolate a geographical location based on known latitude and longitude coordinates (e.g., Location Data 302a of FIG. 3) for a map tile. The received location data may also indicate whether the user has selected a designated location (i.e., selected a predefined map feature indicated by an icon or other appropriate marker and having a predefined place page.)

Next, at block 406, a system determines whether the location selection corresponds to a designated location, i.e., a location at which a predefined map feature having a predefined place page associated therewith exists. In certain implementations, the user selects a designated location shown on the map, and this location may be indicated in the received location selection data, as discussed above with respect to block 404. In other implementations, a user selection may correspond to a designated location, but the location may not be visible on the displayed map. For example, a user may be looking at a zoomed-out view of a map and a particular location of interest may actually be at or near the location the user selected but the location of interest might not be displayed until the map view is zoomed in further. In these implementations, the system may analyze data at various zoom levels for the selected location to determine whether the user selection corresponds to a designated location, even if an icon for that location is not visible on the present map view. Depending on the zoom level of the displayed map and the density of map features in the vicinity of the user selection, the system may look at various radiuses surrounding the selected location at the various zoom levels, in order to determine whether the location selection corresponds to a designated location.

For example, in a rural setting with very few designated locations at any map zoom level, the system may consider any feature within a fairly large radius of the selected location as being selected, as the map considers data at further zoomed in levels. On the contrary, in a dense, urban setting with a large number of designated locations, as the map zooms in, the system may only consider a location selected if the exact location selection is within a fairly small radius of the actual designated location. In certain implementations, if the user selection is close to, but has not actually at a designated location, the designated location, along with other nearby designated locations may be displayed as local interest pages, as shown in FIGS. 2A and 2B.

If the user has selected a designated location, the system finds the predefined place page for the designated location at block 408 and then presents that place page to the user at block 420, which will be discussed in further detail below.

If the user has not selected a designated location at the block 406, the system determines one or more addresses corresponding to the selected location at the block 410. In certain implementations, instead of determining an address or series of addresses corresponding to the selected location, the system may determine a specific location name (e.g., the name of a predefined location, landmark, place of interest, etc.) or a higher-level geographical description (e.g., a city, county, state, country name, etc.) As discussed above, the selected location may be received as terms of x-y coordinates, which define a relative position on the displayed map and/or a given tile on the map and may be used to interpolate a geographical location based on known latitude and longitude coordinates for a map tile. Depending on the zoom level of the displayed map and the density of map features in the vicinity of the user selection, the system may look at various radiuses surrounding the selected location at the various zoom levels, in order to determine the selected address, a range of possible addresses, a specific location name, or a higher-level geographical description as appropriate. For example, a user may be looking at a zoomed-out view of a map and a building or location with a particular address may actually be at or near the location the user selected but the building or location might not be displayed until the map view is zoomed in further. In these implementations, the system may analyze data at various zoom levels to determine whether the latitude and longitude coordinates of the user selection correspond to a particular predefined location, even if that location is not visible on the present map view. In certain implementations, the system may interpret the actual location of the user selection as corresponding to a particular address if the actual location is within a certain radius of the particular address.

Based on the known latitude and longitude coordinates, the system may access a data repository such as, for example, address repository 130F to look up an address or addresses near the interpolated geographical location. In certain implementations, the system may determine a single address for a selected location. In other implementations, (e.g., in rural settings where large areas of land do not have properties or structures with specific addresses) the system may determine a range of possible addresses.

At blocks 412-418, the system may access one or more data repositories, such as, for example, a street view repository 130A, a traffic data repository 130B, a social networking repository 130C, a user photo repository 130D, a knowledge repository 130E, etc. in order to accumulate or find data that may be presented to a user in a newly generated place card or place page. For example, at the block 412, the system may access street view data from street view repository 130A. The street view data may contain one or a series of photographs of street level images at or near the selected location and allow a user to see what the selected location and surrounding areas look like from a street-level perspective. At the block 414, the system may access traffic data from traffic data repository 130B. The traffic data may be presented on or near the newly generated card to provide the user with a sense of real-time traffic conditions near the selected location. At the block 416, the system may access social networking data relevant to the selected location from social networking repository 130C. The social networking data may include, for example, data about a user's friends' check-ins to the selected location or to locations near the selected location, user reviews of a location, a user's friends' social media posts about a selected location, etc. The social networking data may also include, for example, photos that a user's friends have taken or posted of a selected location or comments a user or a user's friends have made about a selected location on social media websites. In certain implementations, the social networking data may be selected from a subset of friends whose in posts, photos, reviews, videos, etc. the user has indicated that he is particularly interested in.

At the block 418, the system may access data relevant to the selected location from knowledge repository 130E. This data may include, for example, information from websites about the selected location, links to resources about the selected location, wiki entries about the location, etc.

After accessing data at the blocks 412-418, the system may generate a new place page or place card at the block 420. In certain implementations, the system may generate a card that includes all of the retrieved data. In other implementations, the system may select a subset of the most relevant data to display. For example, if the retrieved streetview data is very similar to the retrieved user photographs of the selected location, the system may only present the streetview data on the place page. The system may also user known user preferences to select which data to show as part of the place page data or card. For example, if a user is signed into his or her account while using the map and has indicated on his or her user profile that he or she is very interested in architectural photos but is not particularly engaged in his or her friends' posts on social media, the system may ensure that retrieved photographs are displayed on the generated place page, while the social networking data is not included. The generated place page may be similar to place cards 220 and 221 as shown in FIGS. 2A and 2B. Further, the generated place page will be similar in format and substance to predefined place pages, so as to provide the user with a seamless user experience regardless of whether the user selects a location with a predefined place page associated therewith or whether the user selects a location that does not have a predefined place page associated therewith.

At a block 422, the system presents the place page on the map and may also refocus the map around the selected location. As discussed above, with respect to FIGS. 2A and 2B, the place page may be presented in a variety of formats and contain various types of data. In a given implementation, however, both predefined place pages and place pages generated in response to a user selection will be formatted similarly and contain similar types of data. Further, as previously discussed, when a map is refocused around a selected location, the map may show additional places of interest, street names, attractions, etc. that were not shown on the map prior to the user interaction. More specifically, certain labels, icons, street names, traffic conditions, etc. near the selected location that would normally only be displayed on higher zoom levels than the current zoom level may be displayed after the location has been selected by the user.

Certain implementations are described herein as including logic or a number of components, modules, or mechanisms. Modules may constitute either software modules (e.g., code or instructions embodied on a machine-readable medium or in a transmission signal, wherein the code is executed by a processor) or hardware modules. A hardware module is tangible unit capable of performing certain operations and may be configured or arranged in a certain manner. In example implementations, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various implementations, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering implementations in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In implementations in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example implementations, comprise processor-implemented modules.

Similarly, the methods or routines described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example implementations, the processor or processors may be located in a single location (e.g., within a home environment, an office environment or as a server farm), while in other implementations the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example implementations, the one or more processors or processor-implemented modules may be located in a single geographic location (e.g., within a home environment, an office environment, or a server farm). In other example implementations, the one or more processors or processor-implemented modules may be distributed across a number of geographic locations.

As used herein, the terms module, block, function, operation, procedure, routine, step, and method refer to tangible computer program logic or tangible computer executable instructions that provide the specified functionality to the system 100. Thus, a module, block, function, operation, procedure, routine, step, and method can be implemented in hardware, firmware, and/or software.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "some implementations" or "an implementation" means that a particular element, feature, structure, or characteristic described in connection with the implementations is included in at least one implementation. The appearances of the phrase "in some implementations" in various places in the specification are not necessarily all referring to the same implementation.

Some implementations may be described using the expression "coupled" and "connected" along with their derivatives. For example, some implementations may be described using the term "coupled" to indicate that two or more elements are in direct physical or electrical contact. The term "coupled," however, may also mean that two or more elements are not in direct contact with each other, but yet still co-operate or interact with each other. The implementations are not limited in this context.

Further, the figures depict exemplary implementations of a system for allowing users to retrieve useful information associated with any location on a digital map for purposes of illustration only. One skilled in the art will readily recognize from the following discussion that alternative implementations of the structures and methods illustrated herein may be employed without departing from the principles described herein Upon reading this disclosure, those of skill in the art will appreciate still additional alternative structural and functional designs for a system and a process for allowing users to retrieve useful information associated with any location on a digital map through the disclosed principles herein. Thus, while particular implementations and applications have been illustrated and described, it is to be understood that the disclosed implementations are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The invention claimed is:

1. A computer-implemented method for use in a computing device having a user interface for supporting user interactions with locations on an interactive digital map displayed on the user interface, the method comprising:
   displaying a digital map that includes a set of designated locations each represented by an indicator on the digital map indicating that a designated location has a predefined place page, and a set of non-designated locations;
   receiving selection data that specifies a location selected by a user on the digital map displayed on the user interface of the computing device;
   in response to determining that the selected location is in the set of non-designated locations, displaying a first place card having a certain shape and a certain size on the user interface; and
   in response to determining that the selected location is in the set of designated locations, displaying a second place card having a similar shape and a similar size, the second place card including the predefined place page for the location in the set of designated locations, wherein the first place card and the second place card appear in a visually indistinguishable manner, except for location-specific information in the first place card and the second place card.

2. The method of claim 1, further comprising, in response to determining that the selected location is in the set of non-designated locations, refocusing the digital map in the vicinity of the selected location by automatically displaying additional map data not previously shown on the digital map in the vicinity of the selected location.

3. The method of claim 2, wherein automatically displaying the additional map data not previously shown on the digital map in the vicinity of the selection location includes displaying one of a label or a point of interest icon or a traffic indication in the vicinity of the selection location.

4. The method of claim 1, further comprising:
   obtaining a set of informational data describing the selected location by querying at least one of a plurality of information data sources for information associated with the selected location,
   wherein obtaining a set of informational data comprises selecting a subset of potential informational data from the plurality of information data sources as the set of informational data and using the selected subset of informational data as the set of informational data.

5. The method of claim 4, wherein selecting a subset of potential informational data is performed based on stored user preferences.

6. The method of claim 4, wherein querying at least one of a plurality of information data sources includes communicating with a server device over a communication network to query at least one of the plurality of informational data sources.

7. The method of claim 4, further comprising, receiving interaction data that specifies a user interaction with the first place card including the obtained set of informational data.

8. The method of claim 7, wherein the interaction data indicates that a user is saving the first place card including the obtained set informational data.

9. The method of claim 7, wherein the interaction data indicates that a user is sharing the first place card including the obtained set informational data.

10. The method of claim 7, wherein the interaction data indicates that a user is reporting information regarding the first place card including the obtained set informational data.

11. The method of claim 7, wherein the interaction data indicates that a user is editing the first place card including the obtained set informational data.

12. A computer-implemented method for use in a computing device having a user interface for supporting user interactions with any location on an interactive digital map, the method comprising:
   displaying a digital map that includes a set of designated locations each represented by an indicator on the digital map indicating that a designated location has a predefined place page, and a set of non-designated locations;
   receiving data that specifies a location that a user selects on the digital map;
   in a first instance, displaying a first place card having a certain shape and a certain size on the user interface including the predefined place page, when the user-selected location is in the set of designated locations; and
   in a second instance, displaying a second place card having a similar shape and a similar size on the user interface when the user-selected location is in the set of non-designated locations, so that the first place card and the second place card appear in a visually indistinguishable manner, except for location-specific information in the first place card and the second place card.

13. The method of claim 12, further comprising, automatically displaying additional map data not previously shown on the digital map in the vicinity of the user-selected location upon determining that the user-selected location is in the set of non-designated locations.

14. The method of claim 13, wherein automatically displaying the additional map data not previously shown on the digital map in the vicinity of the user-selection location includes displaying one of a map label or a point of interest icon or a traffic indication in the vicinity of the user-selection location.

15. A computer device, comprising;
one or more processors;
a user display coupled to the one or more processors; and
a computer readable memory that stores routines for execution on the one or more processors, the memory including:
   a first routine that, when executed on the one or more processors, detects an interaction of a user with a digital map displayed on a user interface to determine a user-selected location on the digital map having a set of designated locations each represented by an indicator on the digital map indicating that a designated location has a predefined place page, and having a set of non-designated locations, wherein the user selects the user-selected location on the digital map; and
   a second routine that displays a first place card having a certain shape and a certain size on the user display in response to the user selecting the user-selected location in the set of non-designated locations, the first place card including informational data, and displays a second place card having a similar shape and a similar size in response to the user selecting a location in the set of designated locations, the second place card including the predefined place page for the location in the set of designated locations, wherein the first place card and the second place card are presented in a visually indistinguishable manner, except for location-specific information in the first place card and the second place card.

16. The computer device of claim 15, further including a third routine that, when executed on the one or more processors, displays additional map data not previously shown on the digital map in the vicinity of the user-selected location based on the detection of the user interaction with the digital map at the user-selected location.

17. The computer device of claim 16, wherein the third routine displays the additional map data not previously shown on the digital map in the vicinity of the user-selected location by displaying one of a map label or a point of interest icon or a traffic indication in the vicinity of the user-selection location.

18. The computer device of claim 17, wherein the third routine obtains the additional map data from a map database as being stored with a zoom level of map data other than a zoom level of map data currently being displayed on the user interface as the digital map.

19. The computer device of claim 15, further including a third routine that, when executed on the one or more processors, determines a set of informational data for the user-selected location, wherein the third routine obtains a newly generated set of informational data pertaining to the user-selected location based on informational data stored in at least one of a plurality of informational data sources for information associated with the user-selected location, wherein the third routine generates the set of informational data by selecting a subset of potential informational data from the plurality of informational data sources as the set of informational data.

20. The computer device of claim 19, wherein the third routine selects a subset of potential informational data based on stored user preferences.

* * * * *